United States Patent Office 3,471,514
Patented Oct. 7, 1969

3,471,514
PROCESS FOR α-(5-NITROINDOLYL-3)-
ALKANOIC ACIDS
Daniel J. Carey, Clark, George Gal, Summit, and Meyer Sletzinger and Donald F. Reinhold, North Plainfield, N.J., assignors to Merck & Co., Inc., Rahway, N.J., a corporation of New Jersey
No Drawing. Continuation-in-part of application Ser. No. 480,190, Aug. 16, 1965. This application Nov. 14, 1966, Ser. No. 593,662
Int. Cl. C07d 27/56
U.S. Cl. 260—326.13                          8 Claims

ABSTRACT OF THE DISCLOSURE

α-(5-nitroindolyl-3)-alkanoic acids are prepared in greatly improved yields by the Fischer indole synthesis from the corresponding phenyl hydrazine and levulinic acid derivatives (or from the hydrazone produced by condensing said phenyl hydrazine with said levulinic acid derivatives) by carrying out the reaction under controlled conditions involving keeping the reaction mixture 30 to 55% by weight hydrochloric acid and controlling the reaction temperature and time within specified parameters. The hydrochloric acid content is best controlled by using a sealed vessel.

---

This application is a continuation-in-part of application Ser. No. 480,190, filed Aug. 16, 1965, and now abandoned.

This invention relates to the preparation of α-(2-methyl-5-nitro-3-indolyl)acetic acid and substituted derivatives thereof.

The terms "substituted" and "substituents" as used herein carry a very broad implication and includes substituents on the α-carbon atom of the acetic acid moiety and the benzenoid portion of the indolyl radical. Such substituents may be selected from a very broad class with the proviso that, unless they can be chemically protected during the course of the reaction, they must be inert to the reagents employed. The following formula, while not intended to limit the invention to the products illustrated, is exemplary of the large number of compounds which can be prepared by the process of the invention:

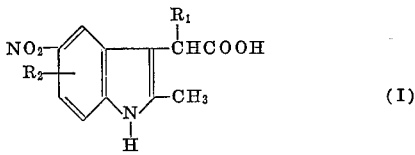

In the formula:
$R_1$ may be, for example, hydrogen or a lower alkyl group containing, in preferred species, up to six carbon atoms, and
$R_2$ may be, for example, hydrogen, halogen or lower alkyl. The last mentioned groups may contain up to six carbon atoms.

The compounds prepared by the process of this invention are useful intermediates for the preparation of a large class of 1-acylated indolyl compounds which are known for their high degree of anti-inflammatory activity and for their utility in the prevention and inhibition of granuloma tissue formation. They are also of value in the treatment of dermatological disorders and like conditions responsive to treatment with conventional anti-inflammatory agents. These compounds are prepared by acylation of selected indoles, suitably those prepared in accordance with this invention, utilizing aroyl or heteroaroyl acylating agents such as benzoyl, naphthoyl, or nicotinoyl, preferably substituted benzoyl, naphthoyl or nicotinoyl.

The therapeutically useful 1-acylated indoles which may be prepared utilizing the 5-nitroindoles prepared herein are those having a nitrogen atom attached to the number five position of the indole ring, more specifically a nitro group or a group derivable therefrom by known reactions such as amino, methylamino, dimethylamino, N-morpholino and the like. The compounds may be represented by the formula:

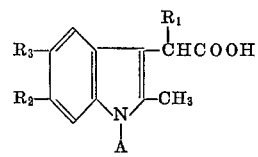

wherein $R_1$ and $R_2$ have the same meaning as above, A is an aromatic acyl group and $R_3$ is nitro or other nitrogen containing group such as set forth above. Typical representatives of the class are 1-(p-chlorobenzoyl)-2-methyl-5-dimethylamino-3-indolyl acetic acid and 1-(p-methylthiobenzoyl)-2-methyl-5-acetamido-3-indolyl acetic acid.

The aforesaid acylation step is usually carried out on an ester derivative of a compound of Formula I, preferably an ester which can be readily converted to an acid without affecting the acyl group. Tertiary butyl esters are especially satisfactory, since the t-butoxy group is easily removed by pyrolysis. It will be appreciated, however, that such acylation cannot be effected if the indole is substituted with a group such as the amino group or an alkylamino group having an active hydrogen atom. It is for this reason hat the 5-nitro compounds of this invention are especially valuable. They can be acylated without undue interference by side reactions attributable to active hydrogens. The nitro group can be converted to the desired functional group, for example, by reduction to an amino group and, if desired, by further reaction of the amino group with an alkyl halide to produce alkyl substituted amines. Other conversions of the amino group can be effected by known procedures to produce additional therapeutically active compounds.

In one convenient method for the preparation of these valuable 5-nitroindoles, a p-nitrophenylhydrazine is reacted with a levulinic acid in aqueous hydrochloric acid to produce an intermediate phenylhydrazone which may be cyclized in situ or separated and cyclized in fresh aqueous hydrochloric acid. Unfortunately, the product synthesized by this method is obtained in a very low yield.

It has now been discovered that the low yield can be alleviated by carrying out the reaction in concentrated hydrochloric acid with careful control of time and temperature under conditions such that the amount of hydrogen chloride in the liquid reaction mixture during the course of the reaction does not vary appreciably from the original amount present in the starting mixture.

The reaction can be carried out with a phenyl hydrazine and a levulinic acid or with a phenylhydrazone condensation product of a phenylhydrazine and a levulinic acid as the initial reactants. In any event, the concentration of hydrochloric acid in the reaction mixture is to be maintained from 30 to 55% by weight, preferably between 38 and 45% hydrochloric acid.

The percentage of hydrogen chloride is most conveniently maintained constant in the liquid reaction mixture by carrying out the reaction in a closed vessel so that the only hydrogen chloride which escapes from the liquid phase is the relatively small quantity required to establis equilibrium within the vessel at the selected temperature. Normally, the reaction vessel chosen will be one in which the total volume is approximately 1.5 to 3 times the volume of the reaction mixture.

The mole ratio of levulinic acid to phenylhydrazine is not critical. Using less than a mole equivalent will decrease the yields. Therefore, it is preferable to use at least one mole equivalent, but especially 15 to 40% excess of levulinic acid.

The reaction is preferably carried out at a temperature of from 55 to 65° C., especially at or near 60° C., although temperatures as low as 50° C. or as high as 80° C. can be used. These are not preferred however since at the lower temperature the reaction time is unduly prolonged with little increase in yield, and at the higher temperature, despite reduction in heating time, there is some formaion of tarry side products.

The reaction time will vary with the selected temperature and may be from about 8 to about 120 hours. In the preferred temperature range, the reaction period will vary from 45 to 100 hours.

The aforesaid reaction parameters are applicable whether starting with a phenylhydrazine of a phenylhydrazone. In either event, the yield may be increased as much as six-fold compared with the yield obtained when operating under the usual conditions in which hydrogen chloride is allowed to escape during the reaction period. Moreover, the product is much more readily isolated in pure form, since the large amounts of tarry byproducts ordinarily produced are absent.

The invention may be illustrated by the following reaction sequence which specifically illustrates the preparation of 2-methyl-5-nitro-3-indolyl acetic acid:

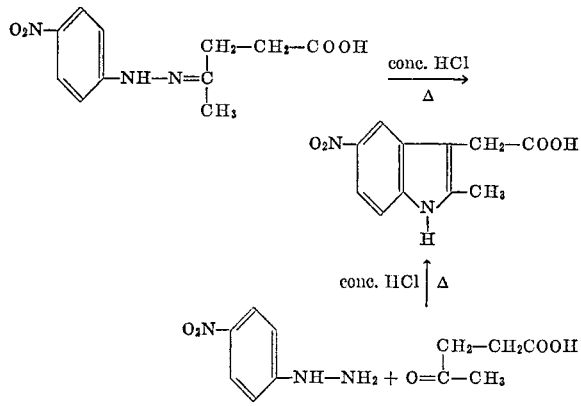

The indolyl acid thus produced can be directly actylated by reaction, for example, with an alkali metal hydride and an acyl halide. It is preferred, however, to convert the acid to an ester before acylation. The nitro group may then, if desired, be converted to a derivative as described above. Cetrain of these procedures are illustrated in the examples.

The following nonlimiting examples are given by way of illustration only.

EXAMPLE 1

2-methyl-5-nitro-3-indolyl acetic acid p-Nitrophenylhydrazine (1.36 moles) and 1.5 moles of levulinic acid are added to 1200 ml. of 37% hydrochloric acid. The ratio of hydrogen chloride to phenylhydrazine is 10.7:1. The mixture is shaken at 80° C. for ten hours in a closed system, filtered and the residue washed with water, concentrated hydrochloric acid and again with water to produce 2-methyl-5-nitro-3-indolyl acetic acid in a yield of 29.8%.

When 1.36 moles of 3-fluoro-4-nitrophenylhydrazine are substituted in the above procedure, the two isomers which are obtained, 2-methyl-4-fluoro-5-nitro-3-indolyl acetic acid and 2-methyl-5-nitro-6-fluoro-3-indolyl acetic acid, may be separated by chromatography. When an equivalent amount of 3-methyl-4-nitrophenylhydrazine or 3-chloro-4-nitrophenylhydrazine is employed in place of p-nitrophenylhydrazine, both isomers of the resutling indoles are obtained, namely:

2,4-dimethyl-5-nitro-3-indolyl acetic acid;
2,6-dimethyl-5-nitro-3-indolyl acetic acid;
2-methyl-4-chloro-5-nitro-3-indolyl acetic acid; and
2-methyl-5-nitro-6-chloro-3-indolyl acetic acid.

EXAMPLE 2

2-methyl-5-nitro-3-indolyl acetic acid

A total of 0.136 mole of the p-nitrophenylhydrazone of levulinic acid and 120 ml. of 37% hydrochloric acid are shaken at 80° C. in a closed system for ten hours. The solid produced is washed with concentrated hydrochloric acid and then with water to give 2-methyl-5-nitro-3-indolyl acetic acid in a yield of 16.5%.

EXAMPLE 3

By reacting the appropriate reagent according to the procedure of Example 1 or Example 2, a number of compounds represented by the following general formula are produced:

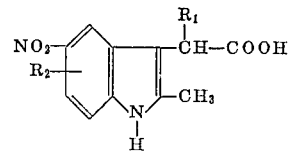

wherein $R_1$ and $R_2$ are as previously defined.

EXAMPLE 4

2-methyl-5-nitro-3-indolyl aceic acid

A mixture of 10.0 g. of p-nitrophenylhydrazine (94.6% pure), 10.4 g. of levulinic acid, and 60 ml. of 37% hydrochloric acid was charged to a glass bomb tube. The tube was cooled in a methanol-Dry Ice bath and 13.45 g. of hydrogen chloride added. The bomb tube was sealed and heated at 60° C. for 90 hours. The tube was cooled, opened and the precipitate filtered. The cake was washed with 37% hydrochloric acid and then water. After drying, the product weighed 12.25 g. (84.6%), M.P. 231–233° C. Eq. wt.=233; U.V. max. 3310, 2725, 2090. E percent=360, 840, 878.

The above example is carried out using the following conditions to obtain the various yield indicated:

| Run | Wt. percent Hcl | Time (hrs.) | Temp. (deg.) | Yield percent |
| --- | --- | --- | --- | --- |
| 1 | 34.6 | 1.0 | 80 | 50 |
| 2 | 38.2 | 60 | 60 | 64 |

EXAMPLE 5

2-methyl-5-nitro-3-indolyl actic acid

A mixture of 820 g. of p-nitrophenylhydrazone of levulinic acid, 7.4 ml. of levulinic acid and 300 ml. of 37% hydrochloric acid was charged to a bomb tube. The tube was cooled and 67 g. of hydrogen chloride added. The tube was sealed and heated in a steel bomb for 90 hours at 60° C. The tube was cooled, opened and the product filtered and dried; weight, 62.6 g. (82%).

The following preparations illustrate the use of products prepared according to the process of this invention to prepare therapeutically active compounds.

PREPARATION 1

α-[1-(p-chlorobenzoyl)-2-methyl-5-amino-3-indolyl] acetic acid (A) 2-methyl-5-nitro-3-indolyl acetic acid anhydride: N,N-dicyclohexylcarbodiimide (0.05 mol), in a minimum volume of tetrahydrofuran, is added to 0.1 mole of 2-methyl-5-nitro-3-indolyl acetic acid in a minimum amount of the same solvent and the mixture shaken vigorously for one minute. After standing overnight at room temperature, filter and removed the solvent in vacuo to yield 2-methyl-5-nitro-3-indolyl acetic anhydride.

(B) t-Butyl-(2-methyl - 5 - nitro-3-indolyl)acetate: A total of 100 ml. of t-butanol and 0.3 g. of fused zinc chloride are added to the product of part A and the mixture refluxed under nitrogen overnight. After filtering, the solvent is removed in vacuo and 500 ml. of chloroform is added. The chloroform solution is washed three times with 200 ml. of water, dried over anhydrous sodium sulfate, filtered, and the solvent removed in vacuo. The residue is t-butyl-(2-methyl-5-nitro-3-indolyl)acetate.

Similarly, the indole acids of Examples 1 to 5, when substituted in this procedure for 2-methyl-5-nitro-3-indolyl acetic acid, will produce the corresponding anhydrides and t-butyl esters.

(C) t-Butyl-[1-(p-chlorobenzoyl) - 2-methyl-5-nitro-3-indolyl]acetate: A total of 0.04 mole of t-butyl-(2-methyl-5-nitro-3-indolyl)acetate in 150 ml. of dimethylformamide is added to 0.08 mole of a 51% sodium hydride-mineral oil mixture in 150 ml. of distilled DMF. The mixture is allowed to stir at 0° C. for one hour and then 0.05 mole of p-chlorobenzoyl chloride in 50 ml. of DMF is added, dropwise, over a period of thirty minutes.

The reaction mixture is stirred for another half hour at 0° C., allowed to stand at that temperature for twelve hours and then filtered. The solids are washed with ether and the washings are added to the filtrate. The latter is washed with water and dried sodium sulfate, the salt filtered off and the filtrate concentrated to dryness. The residue is t-butyl-[1-(p-chlorobenzoyl)-2-methyl-5-nitro-3-indolyl]acetate.

In a similar manner, using any other aroyl or heteroaroyl chloride in place of p-chlorobenzoyl chloride in the above procedure, the corresponding N-1 aroly or heteroaroyl derivatives of the 3-indolyl esters prepared heretofore are synthesized.

(D) t-Butyl - [1 - (p - chlorobenzoyl - 2-methyl - 5-amino-3-indolyl]acetate: t-Butyl-[1-(p-chlorobenzoyl)-2-methyl-5-nitro-3-indolyl]acetate (0.02 mole) in 100 ml. of t-butanol is hydrogenated at 25° C. and atmospheric pressure in the pressure of 1 g. of a 10% palladium-on-charcoal catalyst. After completion of the hydrogenation, the catalyst is filtered off and the solvent evaporated in vacuo to give t-butyl-[1-p-chlorobenzoyl)-2-methyl-5-amino-3-indolyl]acetate.

(E) α - [1 - (p-chlorobenzoyl)-2-methyl-5-amino-3-indolyl]acetic acid: A mixture of 0.005 mole of t-butyl-[1-(p-chlorobenzoyl) - 2 - methyl-5-amino-3-indolyl]acetate and about 1 g. of fine porous plate chips is heated slowly in an oil bath and a nitrogen atmosphere until isobutylene starts to escape. Stirring is initiated and the temperature held constant for about one hour. On cooling, the residue is extracted with saturated sodium bicarbonate solution, filtered, the aqueous solution washed with 100 ml. ether and made neutral with 1 N hydrochloric acid to yield [1-(p-chlorobenzoyl)-2-methyl-5-amino-3-indolyl] acetic acid.

Similarly, when any of the t-butyl esters prepared heretofore are substituted in the above procedure, the corresponding free acids are obtained.

PREPARATION 2

α-[1-(p-thiomethyl)-2-methyl-5-dimethylamino-3-indolyl]acetic acid (A) t - Butyl - (2-methyl-5-dimethylamino-3-indolyl) acetate: A total of 0.01 mole of t-butyl-(2-methyl-5-nitro-3-indolyl)acetate, 150 ml. of t-butanol, 15 ml. of glacial acetic acid and 5 ml. of 37% aqueous formaldehyde are reduced in the presence of 4 g. of Raney nickel catalyst. After filtering, the filtrate is concentrated in vacuo to about 25 ml., 250 ml. of ether is added, and the ether solution is washed twice with 100 ml. saturated sodium bicarbonate solution, twice with 100 ml. of water and then extracted three times with 100 ml. of 2.5 N hydrochloric acid. The combined aqueous extracts are made slightly alkaline with concentrated ammonium hydroxide and extracted three times with 100 ml. of chloroform. The chloroform extracts are combined, washed twice with 100 ml. water, dried over anhydrous potassium carbonate, filtered, and the solvent removed in vacuo to yield t-butyl-2-methyl-5-dimethylamino-3-indolyl acetate.

(B) t-Butyl-(2-methyl-5-dimethylamino-3-indolyl)acetate: This compound is prepared by reaction of the product of part A with p-thiomethylbenzoylchloride in accordance with the procedure of Preparation 1-C.

We claim:
1. A process for preparing a compound of the formula

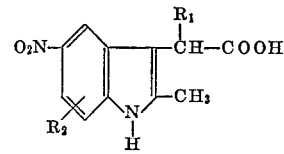

in which $R_1$ is hydrogen or lower alkyl and $R_2$ is hydrogen, halogen or lower alkyl, which comprises reacting, in a sealed vessel, a compound of the formula

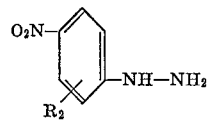

with a compound of the formula

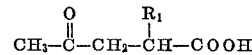

in a reaction mixture containing between 30 and 55% hydrochloric acid by weight at temperatures of from 50 80° C. for a period of from 8 to 120 hours.

2. The process of claim 1, wherein the hydrochloric acid concentration is between 38 to 45%, the temperature of reaction is between 55 to 65° C., and the reaction time is between 45 to 100 hours.

3. The process of claim 1, wherein the hydrochloric acid concentration is between 43 to 45%, the temperature of reaction is between 55 to 65° C., and the reaction time is between 45 to 100 hours.

4. The process of claim 3, wherein the p-nitro-$R_2$-substituted phenylhydrazine is p-nitrophenylhydrazine and the $R_1$-substituted levulinic acid is levulinic acid.

5. A process for preparing a compound of the formula

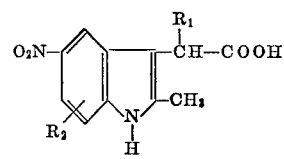

wherein $R_1$ is hydrogen or lower alkyl and $R_2$ is hydrogen, halogen or lower alkyl, which comprises reacting in a sealed vessel a compound of the formula

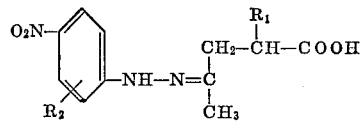

in a reaction mixture containing between 30 to 55% hydrochloric acid by weight at temperatures of from 50 to 80° C. for a period of from 8 to 120 hours.

6. The process of claim 5, wherein the hydrochloric acid concentration is between 38 to 45%, the temperature of reaction is between 55 to 65° C., and the reaction time is between 45 to 100 hours.

7. The process of claim 5, wherein the hydrochloric acid concentration is between 43 to 45%, the temperature of the reaction is between 55 to 65° C., and the reaction time is between 45 to 100 hours.

8. The process of claim 5, wherein the p-nitro-$R_2$-substituted phenylhydrazone of an α-$R_1$-substituted levulinic acid is the p-nitrophenylhydrazone of levulinic acid.

References Cited

UNITED STATES PATENTS 3,161,654 12/1964 Shen _____ 260—326.12
2,068,800 1/1937 Herdieckerhoff et al.

FOREIGN PATENTS 615,395 9/1962 Belgium.

ALEX MAZEL, Primary Examiner
J. A. NARCAVAGE, Assistant Examiner

U.S. Cl. X.R.

260—247.2, 295.5, 326.14